(12) United States Patent
Jagow et al.

(10) Patent No.: US 9,699,953 B2
(45) Date of Patent: Jul. 11, 2017

(54) AIR SEEDER FOR SINGULATED AND BULK SEEDING

(71) Applicant: Bourgault Industries Ltd., St. Brieux (CA)

(72) Inventors: Scot Jagow, St. Brieux (CA); Mark Cresswell, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 72 days.

(21) Appl. No.: 14/994,666

(22) Filed: Jan. 13, 2016

(65) Prior Publication Data
US 2017/0064902 A1  Mar. 9, 2017

(30) Foreign Application Priority Data
Sep. 3, 2015 (CA) ..................................... 2902922

(51) Int. Cl.
| | | |
|---|---|---|
| A01C 5/06 | (2006.01) |
| A01C 7/08 | (2006.01) |
| A01C 7/18 | (2006.01) |
| A01B 49/06 | (2006.01) |
| A01C 7/04 | (2006.01) |
| A01C 7/20 | (2006.01) |
| A01B 73/00 | (2006.01) |
| A01C 15/00 | (2006.01) |

(52) U.S. Cl.
CPC ............... *A01C 5/064* (2013.01); *A01B 73/00* (2013.01); *A01C 7/04* (2013.01); *A01C 7/081* (2013.01); *A01C 7/085* (2013.01); *A01C 7/201* (2013.01); *A01C 15/00* (2013.01); *Y02P 60/16* (2015.11)

(58) Field of Classification Search
CPC ......... A01C 7/081; A01C 7/082; A01C 7/084; A01C 7/12; A01C 15/00; A01C 21/005; A01C 5/064; A01B 73/00; Y02C 60/16
USPC ................................. 111/121, 177, 178, 186
See application file for complete search history.

(56) References Cited

U.S. PATENT DOCUMENTS

| | | | | |
|---|---|---|---|---|
| 4,473,016 A * | 9/1984 | Gust | ...................... | A01C 7/081 111/174 |
| 5,915,313 A * | 6/1999 | Bender | ................ | A01B 79/005 111/178 |
| 6,516,733 B1 * | 2/2003 | Sauder | ................ | A01C 21/005 111/180 |

(Continued)

Primary Examiner — John G Weiss
(74) Attorney, Agent, or Firm — Frost Brown Todd LLC

(57) ABSTRACT

An air seeder apparatus has a frame and a plurality of furrow opener assemblies spaced across a width of the frame at a narrow row spacing, and a plurality of bulk product containers and a bulk meter mounted on each, one of which dispenses seeds through a distribution network to a seed tube on each furrow opener assembly. A plurality of singulating meter is provided, each dispensing singulated seeds to the furrow opener on one of the furrow opener assemblies. During singulating operation seeds are delivered to the singulating furrow opener assemblies only by the singulating seed meter, and during conventional operation seeds are delivered to the singulating furrow opener assemblies only by the bulk meter. A lift system, when in a singulating mode, maintains idle conventional furrow opener assemblies in the transport position while moving singulating furrow opener assemblies between the operating position and the transport position.

31 Claims, 5 Drawing Sheets

(56) References Cited

U.S. PATENT DOCUMENTS

| | | | | |
|---|---|---|---|---|
| 7,428,874 B2* | 9/2008 | Jones | A01B 45/02 | 111/182 |
| 7,430,972 B2* | 10/2008 | Audette | A01B 73/044 | 111/186 |
| 7,765,943 B2* | 8/2010 | Landphair | A01C 7/124 | 111/178 |
| 8,322,293 B2* | 12/2012 | Wollenhaupt | A01C 7/06 | 111/186 |
| 8,863,676 B2* | 10/2014 | Brockmann | A01C 7/088 | 111/186 |
| 9,596,803 B2* | 3/2017 | Wendte | A01C 21/005 | |
| 2015/0223391 A1* | 8/2015 | Wendte | A01C 7/04 | 111/177 |
| 2016/0037713 A1* | 2/2016 | Wendte | A01C 21/005 | 111/177 |
| 2016/0050842 A1* | 2/2016 | Sauder | A01C 7/046 | 111/186 |
| 2016/0192581 A1* | 7/2016 | Henry | A01C 7/102 | 406/14 |

* cited by examiner

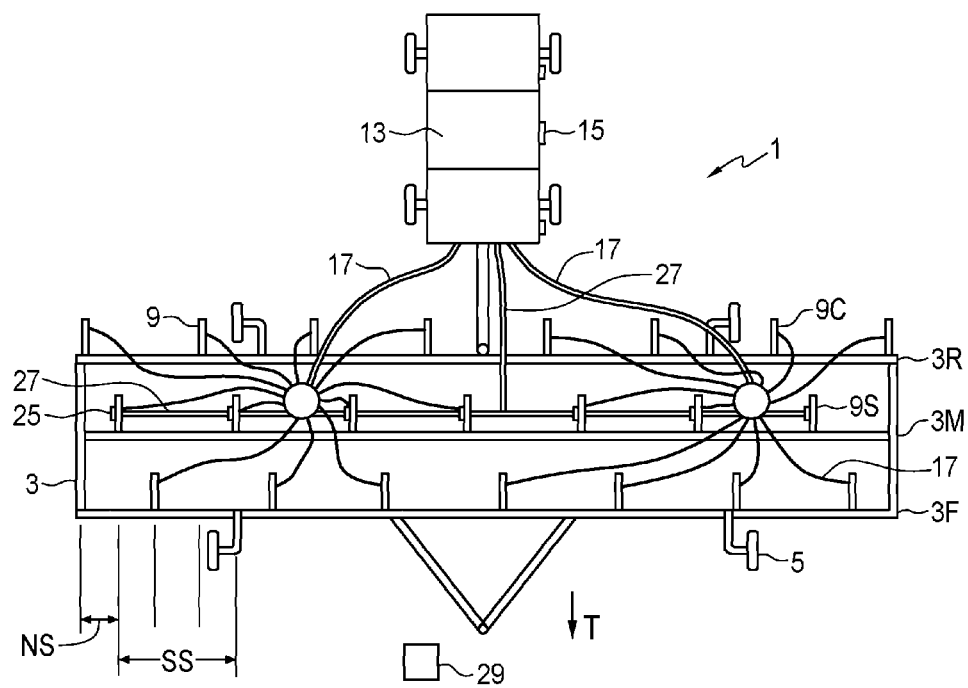
FIG. 1
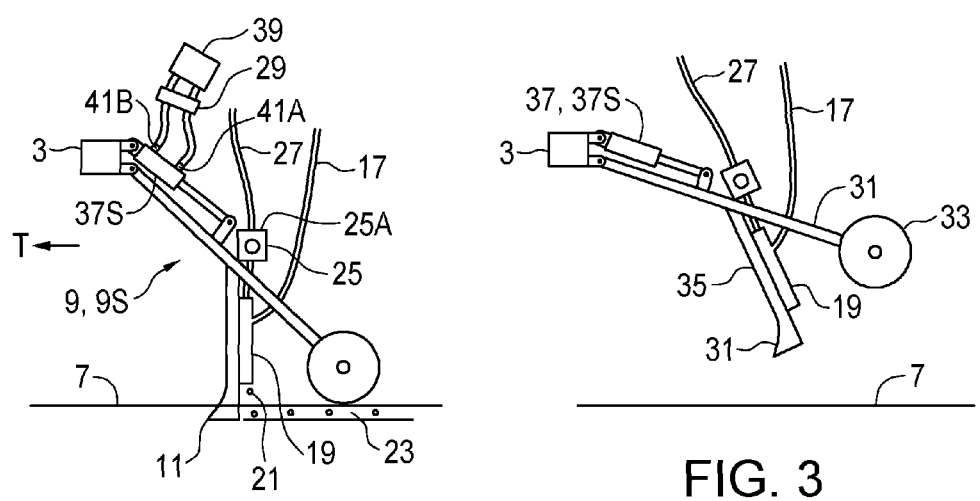
FIG. 2
FIG. 3

AIR SEEDER FOR SINGULATED AND BULK SEEDING

CROSS REFERENCE TO RELATED APPLICATION

This application claims the benefit of and priority to Canadian Patent Application Serial No. 2,902,922, filed Sep. 3, 2015, the contents of which are incorporated herein in its entirety for all purposes.

FIELD OF THE INVENTION

This disclosure relates to the field of agricultural implements and in particular an air seeder apparatus for seeding singulated and bulk metered seeds at different row spacings.

BACKGROUND

Agricultural crops are typically classified as row crops or solid seeded crops. Row crops such as corn, sunflowers, and the like are planted in relatively widely spaced rows, typically about 20-36 inches apart, while solid seeded crops such as wheat, barley, and the like are planted in narrowly spaced rows that are typically only 6-12 inches apart. Once seeded, the spaces between the rows in row crops may be cultivated, and the rows of plants may be sprayed with chemicals etc., and the harvesting equipment for row crops is typically designed to harvest the individual rows. In contrast once seeded, the rows in solid seeded crops are generally ignored and further operations take place generally without regard for the rows.

As a result seeding implements used for seeding each have been quite different. A typical row crop planter has individual planting units spaced across the width of a planter frame, and each planter unit has its own furrow opener, packer, seed container, and metering system for metering seeds from the container down into the furrow opener. In addition many row crops benefit from singulation metering where the metering system drops the seeds one by one down to the furrow opener so that the plants growing from the seeds are substantially equally spaced along the seed row at some selected desirable spacing. In air seeders for row crops, a small seed container on each planting unit is supplied with seed on demand or nursed from the central seed container typically carried on a separate cart.

In contrast in a typical implement for seeding solid seeded crops, a single seed container serves a whole section of furrow openers. In the earlier prior art the seed container extended along the width of the implement with furrow openers mounted under the container. A grooved roller or wheel in the bottom of the container above each furrow opener rotated and so seeds from the container filled the grooves and as the roller rotated it dropped the seeds in bulk down to the furrow opener, rather than singly. Present day air seeders typically have a central seed container with a bulk meter at the bottom, typically again comprising a grooved roller or auger, which feeds seeds in bulk into an air stream which carries the seeds through a network of conduits to each furrow opener.

Popular and profitable row crops such as corn and soybeans typically require a longer growing season than solid seeded crops like wheat and barley, and so have not been grown in agricultural areas with shorter growing seasons such as the northern plains of North America, and in particular Canada. Research and plant breeding is developing newer varieties which mature more quickly, extending the viable agricultural areas for such crops northward. Temperatures also appear to be trending upward which could lead to a corresponding increase in the length of the growing season. Farmers in areas where traditionally only solid seeded crops were grown have an interest in planting these row crops however the seeding implements used for solid seeded crops are not suitable for row crops. Seeding these row crops in more narrowly spaced rows such as are used for solid seeded crops reduces the yield potential and so is not a desirable option. Also solid seeded seeding implements do not have the capability to deliver seeds to the furrow openers one at a time. Purchasing a separate seeding implement for row crops is a considerable expense and so many farmers are reluctant to invest in additional equipment to start seeding row crops.

Case IH™ manufactured a Concord™ air seeder for planting both row crops and solid seeded crops using the Cyclo Air™ meter. The meter dispensed singulated seeds, however instead of dropping the seeds into one furrow opener as in a typical singulating meter, the Cyclo Air™ system distributed the singulated seeds dispensed from the meter into up to eight spaced apart furrow openers with differing delivery tube lengths. Achieving consistent seed spacing in each row with this system is problematic.

U.S. Pat. No. 7,765,943 to Landphair et al. discloses a metering device for mounting above a furrow opener that includes a singulating side and a volumetric or bulk metering side. Seed from a seed source is received by the device and a gate directs the seed either to the singulating side or the bulk metering side, and the metered seed drops out of an aperture in the bottom of the device to the furrow opener.

SUMMARY OF THE INVENTION

The present disclosure provides an air seeder apparatus that overcomes problems in the prior art.

In a first embodiment the present disclosure provides an air seeder apparatus comprising a frame mounted on wheels for travel along a ground surface in an operating travel direction, and a plurality of furrow opener assemblies mounted to the frame, each furrow opener assembly comprising a furrow opener on a bottom end thereof. The furrow opener assemblies are spaced evenly across a width of the frame at a narrow row spacing between a front end of the frame and a rear end of the frame. The apparatus further comprises a plurality of bulk product containers and a bulk meter mounted on each bulk product container, wherein at least one bulk meter is operative to dispense seeds from the corresponding bulk product container into a seed air distribution network and through the seed air distribution network to a furrow opener on each furrow opener assembly. The apparatus further comprises a plurality of singulating meters, each singulating meter operative to dispense singulated seeds to the furrow opener of one of the furrow opener assemblies, such that the furrow opener assemblies include singulating furrow opener assemblies, where seeds are delivered to the furrow openers thereof from the at least one bulk meter or the corresponding singulating meter, and conventional furrow opener assemblies, where seeds are delivered to the furrow openers thereof only from the at least one bulk meter. A nurse system is operative to transfer seed from at least one of the bulk product containers to each singulating meter. During singulating operation seeds are delivered to the furrow openers of the singulating furrow opener assemblies only by the corresponding singulating seed meter, and during conventional operation seeds are delivered to the furrow openers of the singulating furrow opener assemblies only by the at least one bulk meter. The singulating furrow opener assemblies are arranged across the width of the frame at a selected singulating spacing. A furrow opener lift system is operative to move the furrow opener assemblies from a lowered operating position, where each furrow opener engages the ground surface to create a furrow, to a raised transport position where each furrow opener is above the ground surface, and the furrow opener lift system is further operative when in a singulating mode to maintain selected idle conventional furrow opener assemblies in the transport position while moving the singulating furrow opener assemblies between the operating position and the transport position.

In a second embodiment the present disclosure provides a method of seeding row crops at a selected singulating spacing and solid seeded crops at a narrow row spacing with an air seeder comprising a frame mounted on wheels for travel along a ground surface in an operating travel direction, a plurality of furrow opener assemblies mounted to the frame, each furrow opener assembly comprising a furrow opener on a bottom end thereof, a furrow opener lift system operative to move the furrow opener assemblies from a lowered operating position, where each furrow opener engages the ground surface, to a raised transport position where each furrow opener is above the ground surface, a plurality of bulk product containers and a bulk meter mounted on each bulk product container, wherein at least one bulk meter is operative to dispense seeds from the corresponding bulk product container into a seed air distribution network and through the seed air distribution network to each furrow opener assembly, wherein the furrow opener assemblies are spaced evenly across a width of the frame at the narrow row spacing between a front end of the frame and a rear end of the frame. The method comprises providing a plurality of singulating seed meters, each singulating seed meter configured to dispense singulated seeds to a selected furrow opener assembly, the selected furrow opener assemblies spaced across the width of the frame at a selected singulating spacing such that the furrow opener assemblies then include singulating furrow opener assemblies, where seeds are delivered to the furrow openers thereof from the at least one bulk meter or the singulating seed meter, and conventional furrow opener assemblies, where seeds are delivered to the furrow openers thereof only from the at least one bulk meter; seeding the solid seeded crops by activating the furrow opener lift system in a conventional mode to move all the furrow opener assemblies to the operating position, moving the air seeder along the ground surface, and operating the at least one bulk meter to deliver seeds through the seed air distribution network to all the furrow openers while the singulating seed meters are idle; seeding the row crops by activating the furrow opener lift system in a singulating mode to move the singulating furrow opener assemblies to the operating position while maintaining selected idle conventional furrow opener assemblies in the transport position, providing seeds to the singulating seed meter with a nurse system, and moving the air seeder along the ground surface and operating the singulating seed meters to deliver seeds to the furrow openers of the singulating furrow opener assemblies while the seed air distribution network is empty.

The present disclosure provides an air seeder that can seed crops at narrow or wide row spacings, and also provides singulated seed dispensing for wider spaced row crops. Changing the air seeder configuration between one to seed a wide spaced singulated crop and one to seed a narrow spaced solid seeded crop is readily accomplished by connecting or disconnecting the nurse system and bulk meter, and changing the furrow opener lift system from a singulating mode to a conventional mode. The cost to convert a conventional air seeder for solid seeded crops to the air seeder apparatus of the present invention suited to both wide and narrow seeded crops is significantly less than buying a separate seeding implement, and so farm operators can more economically make a move toward planting potentially more profitable crops of either spacing, and also benefit from the evenly spaced plants provided by singulating the seeds.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of an embodiment of the air seeder apparatus of the present disclosure;

FIG. 2 is a schematic side view of a singulating furrow opener assembly of the embodiment of FIG. 1 in the operating position;

FIG. 3 is a schematic side view of the singulating furrow opener assembly of FIG. 2 in the transport position;

Figure 4:
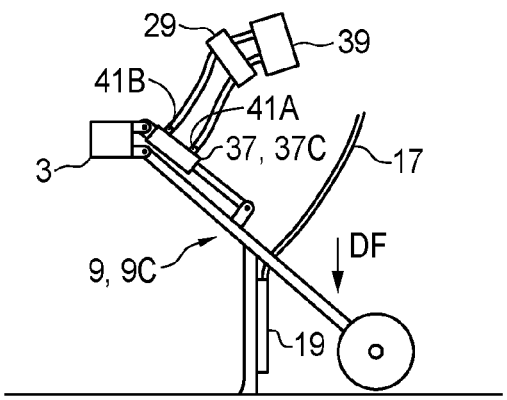
FIG. 4 is a schematic side view of a conventional furrow opener assembly of the embodiment of FIG. 1 in the operating position.

DETAILED DESCRIPTION OF THE
ILLUSTRATED EMBODIMENTS

FIGS. 1-4 schematically illustrate an embodiment of an air seeder apparatus 1 of the present disclosure. The apparatus 1 comprises a frame 3 mounted on wheels 5 for travel along a ground surface 7 in an operating travel direction T. A plurality of furrow opener assemblies 9 is mounted to the frame 3, each furrow opener assembly comprising a furrow opener 11 on a bottom end thereof. The furrow opener assemblies 9 are spaced evenly across a width of the frame 3 between a front end of the frame 3 and a rear end of the frame 3 at a narrow row spacing NS. In the illustrated apparatus 1, the furrow opener assemblies 9 are aligned along front, middle, and rear frame ranks 3F, 3M, 3R perpendicular to the operating travel direction T. Conventional details such as right and left configurations of the furrow opener assemblies 9 are not shown.

In the illustrated apparatus 1 a plurality of bulk product containers 13 is carried on a cart towed behind the frame 3 and a bulk meter 15 is mounted on each bulk product container 13. While the illustrated bulk product containers 13 are shown mounted on a separate cart pulled behind the frame 3, it is also well known to mount the bulk product containers 13 on the frame 3 itself, or on a cart pulled in front of the frame. One of the bulk meters 15 is operative to dispense seeds from the corresponding bulk product container 13 into a seed air distribution network 17 and through the seed air distribution network to a seed tube 19 on each furrow opener assembly 9. Each seed tube 19 is oriented to direct seeds 21 received from the seed air distribution network 17 to a furrow opener 11 and into a furrow 23 formed by the furrow opener 11 moving through the ground surface 7.

A singulating seed meter 25 is shown mounted on each of selected furrow opener assemblies 9, which are henceforth referred to as singulating furrow opener assemblies 9S. Each singulating meter 25 is operative to dispense singulated seeds to the furrow opener 11 of the corresponding singulating furrow opener assembly 9S. In the apparatus 1 then, the furrow opener assemblies 9 include singulating furrow opener assemblies 9S, where seeds 21 are delivered to the furrow openers 11 thereof from either a bulk meter 15 through the seed air distribution network 17 or the corresponding singulating meter 25, and conventional furrow opener assemblies 9C, where seeds 21 are delivered to the furrow openers 11 thereof only from the bulk meter 15 through the seed air distribution network 17. In the illustrated apparatus 1 the singulating furrow opener assemblies 9S are all mounted along the middle frame rank 3M, and the conventional furrow opener assemblies 9C are mounted on the front and rear frame ranks 3F, 3R.

While the singulating seed meters 25 are shown mounted right on the corresponding singulating furrow opener assemblies 9S, it is contemplated that same could instead be mounted on the frame 3, and dispense singulated seeds through a hose or the like to the furrow opener 11 of the corresponding singulating furrow opener assembly 9S. Similarly on each singulating furrow opener assembly 9S both the singulating seed meters 25 and the seed air distribution network 17 are shown, for convenience, dispensing seeds into the same seed tube 19 for delivery to the furrow opener 11, however it is contemplated that in some applications separate tubes will be used.

Each singulating meter 25 includes a small seed hopper 25A and a nurse system 27 as is known in the art is operative to transfer seed from one of the bulk product containers 13 to each singulating meter 25 as needed. During singulating operation, seeds 21 are delivered to the seed tubes 19 of the singulating furrow opener assemblies 9S only by the corresponding singulating seed meter 25, and during conventional operation seeds 21 are delivered to the seed tubes 19 of the singulating furrow opener assemblies 9S only by the bulk meter 15. The singulating furrow opener assemblies 9S are arranged across the width of the frame 3 at a selected singulating spacing SS.

A furrow opener lift system 29 is operative to move the furrow opener assemblies 9 from a lowered operating position shown in FIGS. 2 and 4 where each furrow opener 11 engages the ground surface 7 to create a furrow 23, to a raised transport position shown in FIG. 3 where each furrow opener 11 is above the ground surface 7. The furrow opener lift system 29 is further operative when in a singulating mode to maintain selected idle conventional furrow opener assemblies 9C in the transport position while moving the singulating furrow opener assemblies 9S between the operating position and the transport position.

It is contemplated that in many cases, all of the conventional furrow opener assemblies 9C will be idle and so will be kept in the transport position when the furrow opener lift system 29 is in the singulating mode. In some other cases however it may be desired to use some of the conventional furrow opener assemblies 9C to deposit fertilizer, and so some of the conventional furrow opener assemblies 9C will be idle conventional furrow opener assemblies 9CI during singulating seeding operations, and others will be operating conventional furrow opener assemblies 9CO.

As schematically illustrated in FIGS. 2-4, in the apparatus 1 each furrow opener assembly 9 comprises an opener arm 31 pivotally attached to the frame 3 with a packer wheel 33 on the rear end of the arm 31, and a leg 35 attached to the opener arm 31 with the furrow opener 11 attached to a bottom end of the leg 11. The furrow opener lift system 29 comprises an arm actuator, here provided by an arm hydraulic cylinder 37, on each furrow opener assembly 9 that is operative to selectively pivot the opener arm 31 up and down. The furrow opener lift system 29 is operative when in the singulating mode to pivot the opener arms 31 of the singulating furrow opener assemblies 9S up and down independent of the selected idle conventional furrow opener assemblies 9CI.

In the illustrated apparatus 1 the arm actuators are conveniently provided by arm hydraulic cylinders 37 and, as schematically illustrated in FIG. 4, the furrow opener lift system 29 is configured to control a flow of pressurized hydraulic fluid from a pressurized hydraulic fluid source 39, typically the hydraulic supply of a tractor towing the apparatus 1, to the arm hydraulic cylinders 37. When the furrow opener assemblies 9 are in the operating position, pressurized hydraulic fluid flows into and out of a down port 41B of each arm hydraulic cylinder 37 to exert a downward force DF on the opener arms 31 while the opener arms move up and down to follow the ground surface 7 and when the furrow opener assemblies 9 are in the transport position pressurized hydraulic fluid is directed into an up port 41A of each arm hydraulic cylinder 37 to maintain the furrow opener assemblies 9 in the transport position.

When in a conventional mode the furrow opener lift system 29 directs pressurized hydraulic fluid to the arm hydraulic cylinders 37 of both the conventional and singulating furrow opener assemblies to move all the furrow opener assemblies between the operating position and the transport position.

Figure 5:
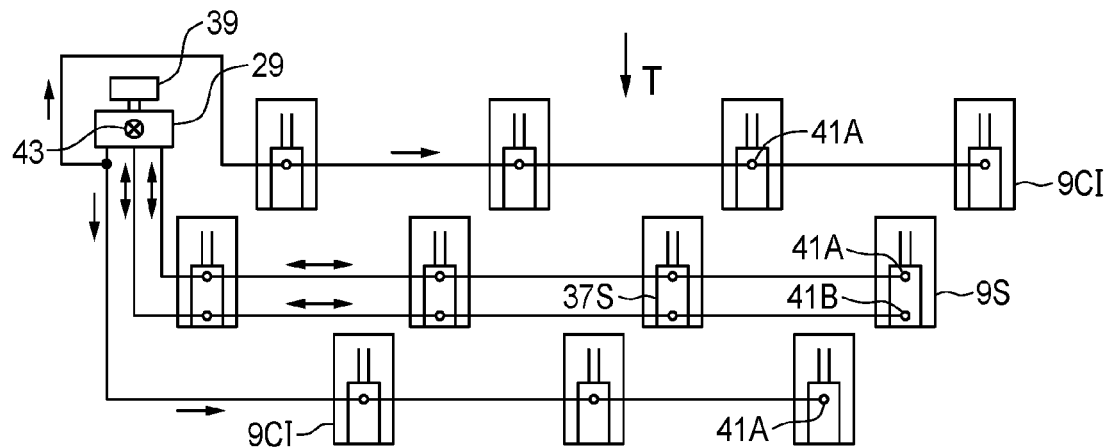
FIG. 5 is a schematic top view of the furrow opener lift system of the embodiment of FIG. 1 where all the conventional furrow opener assemblies are idle.
Figure 6:
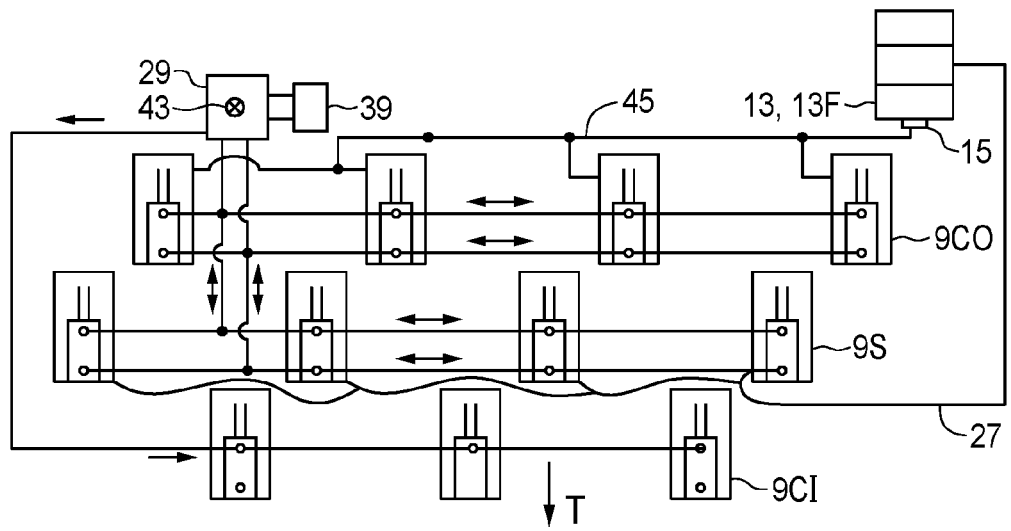
FIG. 6 is a schematic top view of the furrow opener lift system of the embodiment of FIG. 1 where the conventional furrow opener assemblies on the rear frame rank are idle, and the conventional furrow opener assemblies on the front frame rank are operating to deliver fertilizer to the furrows made by the furrow openers on the operating conventional furrow opener assemblies.

When in the singulating mode, the furrow opener lift system 29 in one configuration schematically illustrated in FIGS. 5 and 6, with the frame moving in operating travel direction T, includes valves 43 controlled to direct pressurized hydraulic fluid only to the up port 41A of the arm hydraulic cylinders 37C of the selected idle conventional furrow opener assemblies 9CI, and directs pressurized hydraulic fluid to the up and down ports 41A, 41B of the arm hydraulic cylinders 37S of the singulating furrow opener assemblies and the arm hydraulic cylinders 37C of any selected operating conventional furrow opener assemblies 9CO to move the singulating furrow opener assemblies 9S and the selected operating conventional furrow opener assemblies 9CO between the operating position and the transport position.

In FIG. 5, all of the conventional furrow opener assemblies are idle conventional furrow opener assemblies 9CI, while in FIG. 6, the conventional furrow opener assemblies on the front rank are idle conventional furrow opener assemblies 9CI and the conventional furrow opener assemblies on the rear rank are operating conventional furrow opener assemblies 9CO. FIG. 6 further schematically illustrates that one of the bulk product containers 13 is a fertilizer container 13F and the bulk meter 15 mounted on the fertilizer container 13F is operative to dispense fertilizer from the fertilizer container 13F into a fertilizer air distribution network 45 and through the fertilizer air distribution network 45 to the operating conventional furrow opener assemblies 9CO. Thus in the embodiment shown in FIG. 6, the idle conventional furrow opener assemblies 9CI on the front rank remain in the transport position and do nothing, the singulating furrow opener assemblies 9S on the middle rank move between the operating position and transport position in response to hydraulic fluid controlled by the furrow opener lift system 29 and, receiving seeds from the nurse system 27, deposit singulated seeds into furrows when in the operating position, and the operating conventional furrow opener assemblies 9CO on the rear rank move between the operating position and transport position in response to hydraulic fluid controlled by the furrow opener lift system 29 and deposit fertilizer into furrows when in the operating position.

Figure 7:
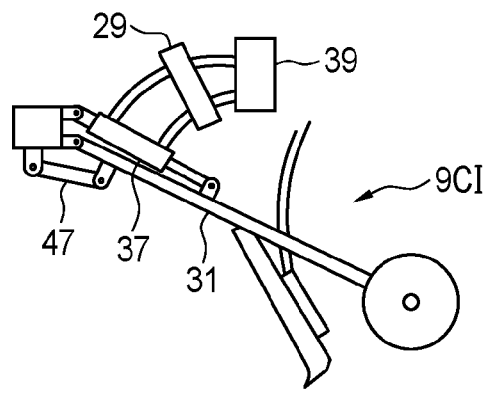
FIG. 7 is a schematic side view of a conventional furrow opener assembly in the transport position that includes an arm lock and that is suitable for use with the embodiment of FIG. 1.

FIG. 7 schematically illustrates an idle conventional furrow opener assembly 9CI of an embodiment where the furrow opener lift system 29 comprises an arm lock 47 on each selected idle conventional furrow opener assembly 9CI operative to lock same in the illustrated transport position. When the furrow opener lift system 29 is in the singulating mode, the arm locks 47 are manually engaged to lock the opener arm 31 of each selected idle conventional furrow opener assembly 9CI in the transport position. Thus when in the conventional mode and when in the singulating mode the furrow opener lift system 29 directs pressurized hydraulic fluid to the arm hydraulic cylinders 37 of the conventional furrow opener assemblies 9C and the singulating furrow opener assemblies 9S to move them between the operating position and the transport position, and when the furrow opener lift system 29 is in the singulating mode the engaged arm locks 47 simply prevent the selected idle conventional furrow opener assemblies 9CI from moving out of the transport position.

Figure 8:
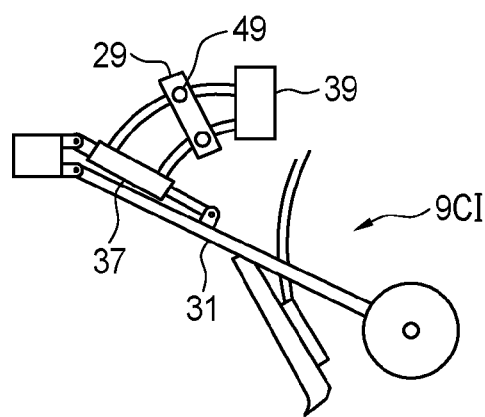
FIG. 8 is a schematic side view of a conventional furrow opener assembly in the idle position that is suitable for use with the embodiment of FIG. 1, and where the furrow opener lift system includes valves operative to prevent hydraulic fluid from moving into or out of the arm hydraulic cylinders of the conventional furrow opener assembly.

FIG. 8 schematically illustrates an idle conventional furrow opener assembly 9CI of an embodiment where the furrow opener lift system 29 comprises valves 49 and wherein when in the conventional mode the furrow opener lift system 29 directs pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and when in the singulating mode the furrow opener lift system 29 directs pressurized hydraulic fluid only to the arm hydraulic cylinders of the singulating furrow opener assemblies and selected operating conventional furrow opener assemblies, and the valves 49 prevent hydraulic fluid from moving into or out of the arm hydraulic cylinders 37 of the idle conventional furrow opener assemblies 9CI.

Figure 9:
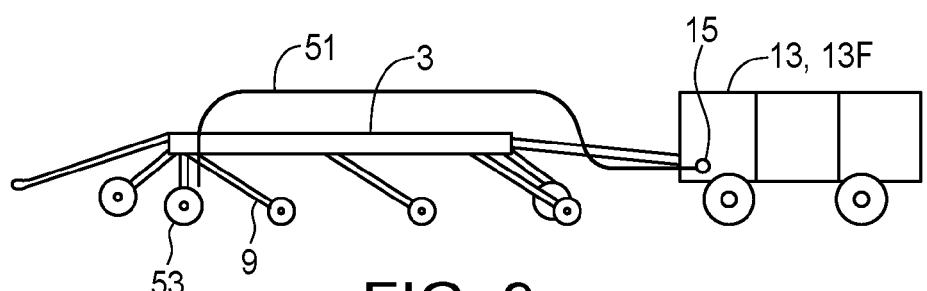
FIG. 9 is a schematic side view of the embodiment of FIG. 1 with the addition of fertilizer banding assemblies, and a fertilizer air distribution network operative to provide fertilizer to the fertilizer banding assemblies.

FIG. 9 illustrates an embodiment where one of the bulk product containers 13 is a fertilizer container 13F and the bulk meter 15 mounted on the fertilizer container 13F is operative to dispense fertilizer from the fertilizer container 13F into a fertilizer air distribution network 51 and through the fertilizer air distribution network 51 to a plurality of fertilizer banding assemblies 53 spaced at a selected banding spacing across the width of the frame 3. The fertilizer banding assemblies 53 are connected only to receive fertilizer from the fertilizer air distribution network 51.

In the apparatus 1 shown in FIG. 1, the singulating furrow opener assemblies 9S are substantially aligned along the middle frame rank 3M perpendicular to the operating travel direction T across the width of the frame 5 and are spaced evenly at the selected singulating spacing SS, and the conventional furrow opener assemblies 9C are arranged forward and rearward of the singulating furrow opener assemblies 9S such that all the furrow opener assemblies 9 are evenly spaced across the width of the frame at the narrow row spacing NS. The selected singulating spacing SS is three times the narrow row spacing NS.

Figure 10:
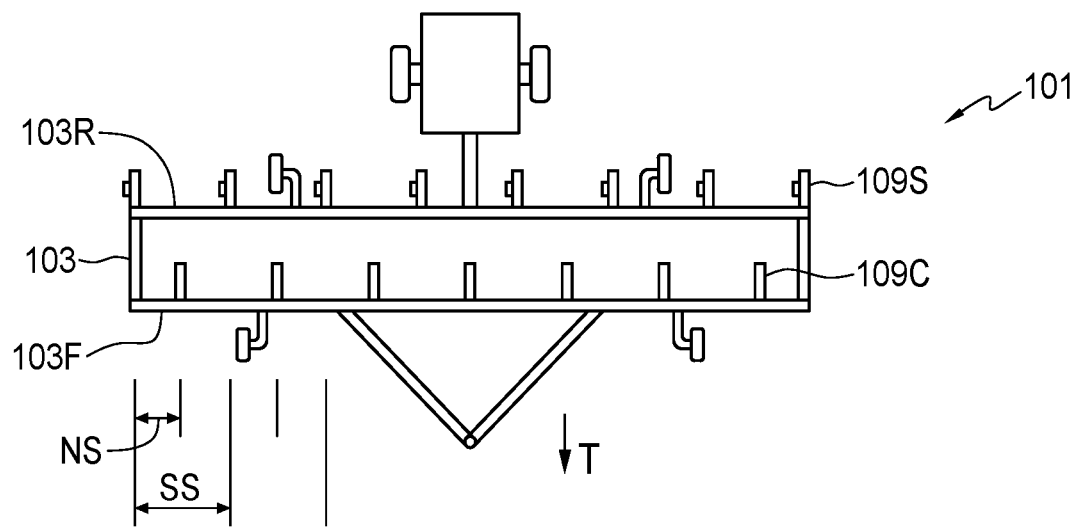
FIG. 10 is a schematic top view of an alternate embodiment of the air seeder apparatus of the present disclosure, where the frame includes only front and rear frame ranks and where the singulating furrow opener assemblies are all mounted on the rear frame rank and the conventional furrow opener assemblies are all mounted on the front frame rank.

In the alternate embodiment of the air seeder apparatus 101 configured to operate in operating travel direction T and schematically illustrated in FIG. 10, the singulating furrow opener assemblies 109S are aligned along a the rear frame rank 103R of the frame 103 and the conventional furrow opener assemblies 109C are substantially aligned along the front frame rank 103F that is forward of the rear rank, and the selected singulating spacing SS is two times the narrow row spacing NS.

Figure 11:
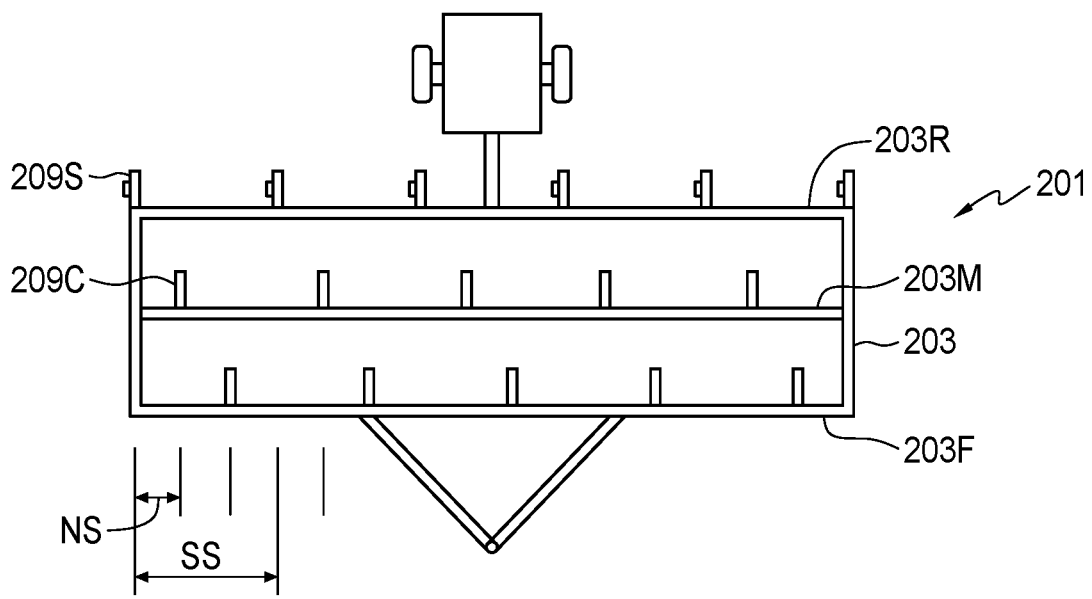
FIG. 11 is a schematic top view of another alternate embodiment of the air seeder apparatus of the present disclosure, where the frame includes front, middle, and rear frame ranks and where the singulating furrow opener assemblies are all mounted on the rear frame rank and the conventional furrow opener assemblies are mounted on the front and middle frame ranks.

FIG. 11 schematically illustrates a further alternate embodiment of the air seeder apparatus 201 where the singulating furrow opener assemblies 209S are aligned along a first rank of the frame 203, here being the rear frame rank 203R and the conventional furrow opener assemblies 209C are aligned along second and third ranks, here being the front and middle frame ranks 203F, 203M. As in the apparatus 1 of FIG. 1 the selected singulating spacing SS is three times the narrow row spacing NS. With the singulating furrow opener assemblies 209S on the rear frame rank 203R, accessibility to the singulating furrow opener assemblies 209S will be improved.

Figure 12:
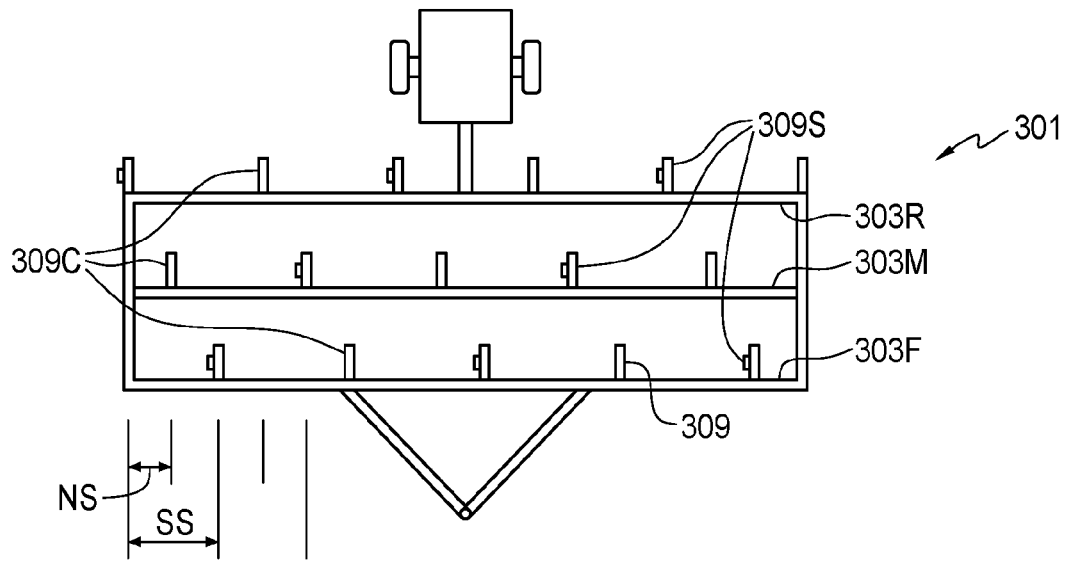
FIG. 12 is a schematic top view of another alternate embodiment of the air seeder apparatus of the present disclosure, where the frame includes front, middle, and rear frame ranks and where singulating and conventional furrow opener assemblies are mounted on all three ranks.

FIG. 12 schematically illustrates a further alternate embodiment of the air seeder apparatus 301 where the furrow opener assemblies 309 are arranged in three ranks, here being front, middle, and rear frame ranks 303F, 303M, 303R and singulating furrow opener assemblies 309S are located on all three ranks. The selected singulating spacing SS of the singulating furrow opener assemblies 309S is here two times the narrow row spacing NS.

Figure 13:
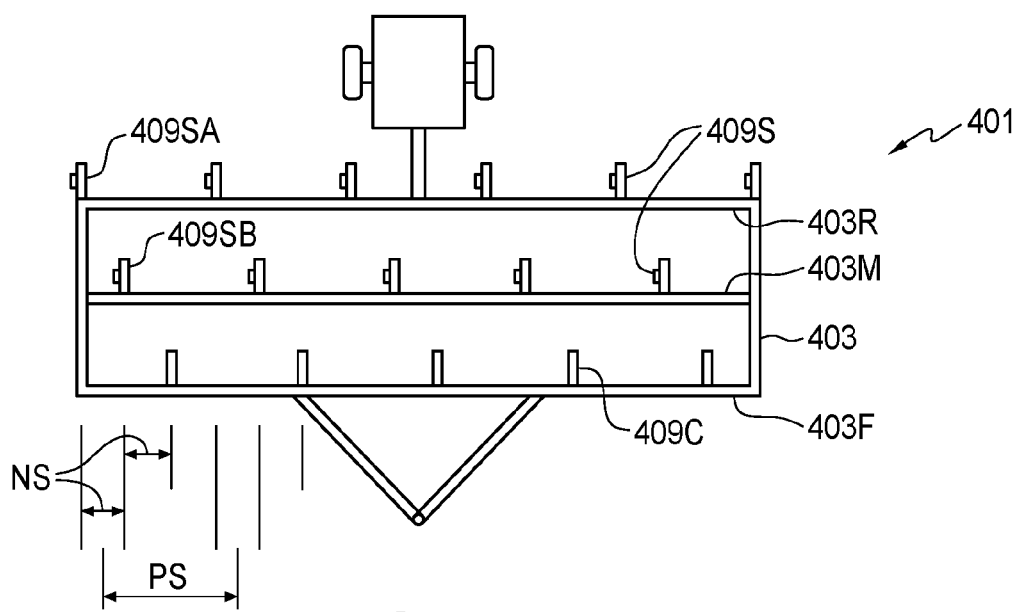
FIG. 13 is a schematic top view of another alternate embodiment of the air seeder apparatus of the present disclosure, where the frame includes front, middle, and rear frame ranks and where the singulating furrow opener assemblies are mounted on the middle and rear frame ranks with adjacent singulating furrow opener assemblies forming a singulating pair and all the conventional furrow opener assemblies are mounted on the front frame rank.

FIG. 13 schematically illustrates a further alternate embodiment of the air seeder apparatus 401 wherein the singulating furrow opener assemblies 409S are not evenly spaced across the width of the frame 403, but instead are arranged in singulating pairs that are evenly spaced across a width of the frame 403. Each pair is formed by first and second singulating furrow opener assemblies 409SA, 409SB spaced at the narrow row spacing NS, and then the singulating pairs are in turn evenly spaced across a width of the frame 403 at a pair spacing PS, from the center of one pair to the center of the next pair, that is three times the narrow row spacing NS. Here the singulating furrow opener assemblies 409S forming the pairs are on the middle and rear frame ranks 403M, 403R and the conventional furrow opener assemblies 409C are on the front frame rank 403F.

It can be seen that the present disclosure provides an air seeder apparatus that provides considerable flexibility in arranging the conventional and singulating furrow opener assemblies on the front, middle, and rear ranks 3F, 3M, 3R of the frame 3 of an air seeder implement, and across the width of the frame 3. The arrangements illustrated and described herein are examples of the possible arrangements on an implement frame of singulating furrow opener assemblies in combination with idle and operating conventional furrow opener assemblies and it is contemplated that such arrangements will be selected to suit individual situations.

The present disclosure further provides a method of seeding row crops at a selected singulating spacing and solid seeded crops at a narrow row spacing with an air seeder comprising a frame 3 mounted on wheels 5 for travel along a ground surface 7 in an operating travel direction T, a plurality of furrow opener assemblies 9 mounted to the frame 3, each furrow opener assembly 9 comprising a furrow opener 11 on a bottom end thereof, a furrow opener lift system 29 operative to move the furrow opener assemblies 9 from a lowered operating position, where each furrow opener 11 engages the ground surface 7, to a raised transport position where each furrow opener 11 is above the ground surface 7, a plurality of bulk product containers 13 and a bulk meter 15 mounted on each bulk product container 13, where at least one bulk meter 15 is operative to dispense seeds 21 from the corresponding bulk product container 13 into a seed air distribution network 17 and through the seed air distribution network 17 to each furrow opener assembly 9, and wherein the furrow opener assemblies 9 are spaced evenly across a width of the frame 3 at the narrow row spacing NS between a front end of the frame 3 and a rear end of the frame 3. The method comprises mounting a singulating seed meter 25 on selected furrow opener assemblies 9 spaced across the width of the frame 3 at a selected singulating spacing SS such that the furrow opener assemblies 9 then include singulating furrow opener assemblies 9S, where seeds 21 are delivered to the furrow openers 11 thereof from the at least one bulk meter 15 or the singulating seed meter 25, and conventional furrow opener assemblies, 9C where seeds are delivered to the furrow openers 11 thereof only from the at least one bulk meter 15; seeding the solid seeded crops by activating the furrow opener lift system 29 in a conventional mode to move all the furrow opener assemblies 9 to the operating position, moving the air seeder along the ground surface 7, and operating the at least one bulk meter 15 to deliver seeds through the seed air distribution network 17 to all the furrow openers 11 while the singulating seed meters 25 are idle; seeding the row crops by activating the furrow opener lift system 29 in a singulating mode to move the singulating furrow opener assemblies 9S to the operating position while maintaining selected idle conventional furrow opener assemblies 9CI in the transport position, providing seeds to the singulating seed meter 25 with a nurse system 27, and moving the air seeder along the ground surface 7 and operating the singulating seed meters 25 to deliver seeds to the furrow openers 11 of the singulating furrow opener assemblies 9S while the seed air distribution network 17 is empty.

The present disclosure thus provides an air seeder apparatus, and method of seeding, that can seed crops at narrow or wide row spacings, and that provides singulated seed dispensing for wider spaced row crops. Changing the air seeder configuration between one to seed a wide spaced singulated crop and one to seed a narrow spaced solid seeded crop is readily accomplished by connecting or disconnecting the nurse system and bulk meter, and changing the furrow opener lift system from a singulating mode to a conventional mode. The cost to convert a conventional air seeder for solid seeded crops to the air seeder apparatus of the present invention suited to both wide and narrow seeded crops is significantly less than buying a separate seeding implement for row crops.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air seeder apparatus comprising:
   a frame mounted on wheels for travel along a ground surface in an operating travel direction;
   a plurality of furrow opener assemblies mounted to the frame, each furrow opener assembly comprising a furrow opener on a bottom end thereof;
   wherein the furrow opener assemblies are spaced evenly across a width of the frame at a narrow row spacing between a front end of the frame and a rear end of the frame;
   a plurality of bulk product containers and a bulk meter mounted on each bulk product container, wherein at least one bulk meter is operative to dispense seeds from the corresponding bulk product container into a seed air distribution network and through the seed air distribution network to a furrow opener on each furrow opener assembly;
   a plurality of singulating meters, each singulating meter operative to dispense singulated seeds to the furrow opener of one of the furrow opener assemblies, such that the furrow opener assemblies include singulating furrow opener assemblies, where seeds are delivered to the furrow openers thereof from the at least one bulk meter or the corresponding singulating meter, and conventional furrow opener assemblies, where seeds are delivered to the furrow openers thereof only from the at least one bulk meter;

a nurse system operative to transfer seed from at least one of the bulk product containers to each singulating meter;

wherein during singulating operation seeds are delivered to the furrow openers of the singulating furrow opener assemblies only by the corresponding singulating seed meter, and during conventional operation seeds are delivered to the furrow openers of the singulating furrow opener assemblies only by the at least one bulk meter;

wherein the singulating furrow opener assemblies are arranged across the width of the frame at a selected singulating spacing;

wherein a furrow opener lift system is operative to move the furrow opener assemblies from a lowered operating position, where each furrow opener engages the ground surface to create a furrow, to a raised transport position where each furrow opener is above the ground surface; and wherein the furrow opener lift system is further operative when in a singulating mode to maintain selected idle conventional furrow opener assemblies in the transport position while moving the singulating furrow opener assemblies between the operating position and the transport position.

2. The apparatus of claim 1 wherein each furrow opener assembly comprises an opener arm pivotally attached to the frame and a leg attached to the opener arm with the furrow opener of the furrow opener assembly attached to a bottom end of the leg, and wherein the furrow opener lift system comprises an arm actuator on each furrow opener assembly operative to selectively pivot the opener arm up and down.

3. The apparatus of claim 2 wherein the furrow opener lift system is operative when in the singulating mode to pivot the opener arms of the singulating furrow opener assemblies up and down independent of the selected idle conventional furrow opener assemblies.

4. The apparatus of claim 3 wherein the arm actuators are provided by arm hydraulic cylinders and the furrow opener lift system is configured to control a flow of pressurized hydraulic fluid to the arm hydraulic cylinders, and wherein when the furrow opener assemblies are in the operating position, pressurized hydraulic fluid flows into and out of a down port of each arm hydraulic cylinder to exert a downward force on the opener arms while the opener arms move up and down to follow the ground surface, and when the furrow opener assemblies are in the transport position pressurized hydraulic fluid is directed into an up port of each arm hydraulic cylinder to maintain the furrow opener assemblies in the transport position.

5. The apparatus of claim 4 wherein when in a conventional mode the furrow opener lift system directs pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and when in the singulating mode the furrow opener lift system directs pressurized hydraulic fluid only to the up port of the arm hydraulic cylinders of the selected idle conventional furrow opener assemblies, and directs pressurized hydraulic fluid to the up and down ports of the arm hydraulic cylinders of the singulating furrow opener assemblies and any selected operating conventional furrow opener assemblies to move the singulating furrow opener assemblies and the selected operating conventional furrow opener assemblies between the operating position and the transport position.

6. The apparatus of claim 5 wherein one of the bulk product containers is a fertilizer container and the bulk meter mounted on the fertilizer container is operative to dispense fertilizer from the fertilizer container into a fertilizer air distribution network and through the fertilizer air distribution network to the selected operating conventional furrow opener assemblies.

7. The apparatus of claim 4 wherein the furrow opener lift system comprises an arm lock on each selected idle conventional furrow opener assembly operative to lock same in the transport position, and wherein when the furrow opener lift system is in the singulating mode, the arm locks are engaged to lock the opener arm of each selected idle conventional furrow opener assembly in the transport position.

8. The apparatus of claim 7 wherein when in the conventional mode and when in the singulating mode the furrow opener lift system directs pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and when the furrow opener lift system is in the singulating mode the engaged arm locks prevent the selected idle conventional furrow opener assemblies from moving out of the transport position.

9. The apparatus of claim 4 wherein when in the conventional mode the furrow opener lift system directs pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and when in the singulating mode the furrow opener lift system directs pressurized hydraulic fluid only to the arm hydraulic cylinders of the singulating furrow opener assemblies and selected operating conventional furrow opener assemblies, and hydraulic fluid is prevented from moving into or out of the arm hydraulic cylinders of the selected idle conventional furrow opener assemblies.

10. The apparatus of claim 9 wherein one of the bulk product containers is a fertilizer container and the bulk meter mounted on the fertilizer container is operative to dispense fertilizer from the fertilizer container into a fertilizer air distribution network and through the fertilizer air distribution network to the selected operating conventional furrow opener assemblies.

11. The apparatus of claim 1 wherein one of the bulk product containers is a fertilizer container and the bulk meter mounted on the fertilizer container is operative to dispense fertilizer from the fertilizer container into a fertilizer air distribution network and through the fertilizer air distribution network to a plurality of fertilizer banding assemblies spaced across the width of the frame, the fertilizer banding assemblies connected only to receive fertilizer from the fertilizer air distribution network.

12. The apparatus of claim 1 wherein the singulating furrow opener assemblies are substantially aligned along a rank perpendicular to the operating travel direction across the width of the frame and are spaced evenly at the selected singulating spacing, and wherein the conventional furrow opener assemblies are arranged forward or rearward of the singulating furrow opener assemblies such that all the furrow opener assemblies are evenly spaced across the width of the frame at the narrow row spacing.

13. The apparatus of claim 12 wherein the singulating furrow opener assemblies are substantially aligned along a first rank and the conventional furrow opener assemblies are substantially aligned along a second rank that is forward or rearward of the first rank, and wherein the selected singulating spacing is two times the narrow row spacing.

14. The apparatus of claim 12 wherein the singulating furrow opener assemblies are substantially aligned along a first rank and the conventional furrow opener assemblies are substantially aligned along second and third ranks, and wherein the selected singulating spacing is three times the narrow row spacing.

15. The apparatus of claim 1 wherein the furrow opener assemblies are arranged in at least three ranks and wherein singulating furrow opener assemblies are located on at least two ranks, and wherein the selected singulating spacing of the singulating furrow opener assemblies is at least two times the narrow row spacing.

16. The apparatus of claim 1 wherein the singulating furrow opener assemblies are arranged in singulating pairs with first and second singulating furrow opener assemblies spaced at the narrow row spacing, and wherein the singulating pairs are evenly spaced across a width of the frame.

17. A method of seeding row crops at a selected singulating spacing and solid seeded crops at a narrow row spacing with an air seeder comprising a frame mounted on wheels for travel along a ground surface in an operating travel direction, a plurality of furrow opener assemblies mounted to the frame, each furrow opener assembly comprising a furrow opener on a bottom end thereof, a furrow opener lift system operative to move the furrow opener assemblies from a lowered operating position, where each furrow opener engages the ground surface, to a raised transport position where each furrow opener is above the ground surface, a plurality of bulk product containers and a bulk meter mounted on each bulk product container, wherein at least one bulk meter is operative to dispense seeds from the corresponding bulk product container into a seed air distribution network and through the seed air distribution network to each furrow opener assembly, wherein the furrow opener assemblies are spaced evenly across a width of the frame at the narrow row spacing between a front end of the frame and a rear end of the frame, the method comprising:

providing a plurality of singulating seed meters, each singulating seed meter configured to dispense singulated seeds to a selected furrow opener assembly, the selected furrow opener assemblies spaced across the width of the frame at a selected singulating spacing such that the furrow opener assemblies then include singulating furrow opener assemblies, where seeds are delivered to the furrow openers thereof from the at least one bulk meter or the singulating seed meter, and conventional furrow opener assemblies, where seeds are delivered to the furrow openers thereof only from the at least one bulk meter;

seeding the solid seeded crops by activating the furrow opener lift system in a conventional mode to move all the furrow opener assemblies to the operating position, moving the air seeder along the ground surface, and operating the at least one bulk meter to deliver seeds through the seed air distribution network to all the furrow openers while the singulating seed meters are idle;

seeding the row crops by activating the furrow opener lift system in a singulating mode to move the singulating furrow opener assemblies to the operating position while maintaining selected idle conventional furrow opener assemblies in the transport position, providing seeds to the singulating seed meter with a nurse system, and moving the air seeder along the ground surface and operating the singulating seed meters to deliver seeds to the furrow openers of the singulating furrow opener assemblies while the seed air distribution network is empty.

18. The method of claim 17 wherein one of the bulk product containers is a fertilizer container and a fertilizer bulk meter mounted on the fertilizer container is operative to dispense fertilizer from the fertilizer container into a fertilizer air distribution network and through the fertilizer air distribution network to selected operating conventional furrow opener assemblies, the method comprising activating the furrow opener lift system in the singulating mode to move the selected operating conventional furrow opener assemblies to the operating position and operating the fertilizer bulk meter to deliver fertilizer to the selected operating conventional furrow opener assemblies while moving the air seeder along the ground surface.

19. The method of claim 17 wherein each furrow opener assembly comprises an opener arm pivotally attached to the frame and a leg attached to the opener arm with the furrow opener of the furrow opener assembly attached to a bottom end of the leg, and wherein the furrow opener lift system comprises an arm actuator on each furrow opener assembly, and comprising pivoting the opener arm up and down by activating the arm actuator.

20. The method of claim 19 comprising activating the furrow opener lift system in the singulating mode to pivot the opener arms of the singulating furrow opener assemblies and any selected operating conventional furrow opener assemblies up and down independent of the selected idle conventional furrow opener assemblies.

21. The method of claim 20 wherein the arm actuators are provided by arm hydraulic cylinders and the furrow opener lift system is configured to control a flow of pressurized hydraulic fluid to the arm hydraulic cylinders, and comprising moving the furrow opener assemblies to the operating position by directing pressurized hydraulic fluid into a down port of each arm hydraulic cylinder to exert a down ward force on the opener arms, and wherein pressurized hydraulic fluid flows into and out of the down port while the opener arms move up and down to follow the ground surface, and comprising moving the furrow opener assemblies to the transport position by directing pressurized hydraulic fluid into an up port of each arm hydraulic cylinder.

22. The method of claim 21 comprising activating the furrow opener lift system in the conventional mode to direct pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and activating the furrow opener lift system in the singulating mode to direct pressurized hydraulic fluid only to the up port of the arm hydraulic cylinders of the selected idle conventional furrow opener assemblies, and to direct pressurized hydraulic fluid to the up and down ports of the arm hydraulic cylinders of the singulating furrow opener assemblies and any selected operating conventional furrow opener assemblies to move the singulating furrow opener assemblies and selected operating conventional furrow opener assemblies between the operating position and the transport position.

23. The method of claim 22 wherein the furrow opener lift system comprises an arm lock on each selected idle conventional furrow opener assemblies operative to lock same in the transport position, and wherein when the furrow opener lift system is activated in the singulating mode, the arm locks are engaged to lock the opener arm of each selected idle conventional furrow opener assembly in the transport position.

24. The method of claim 23 comprising activating the furrow opener lift system in both the conventional mode and the singulating mode to direct pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and wherein the engaged arm locks prevent the selected idle conventional furrow opener assemblies from moving out of the transport position when the furrow opener lift system is activated in the singulating mode.

25. The method of claim 21 comprising activating the furrow opener lift system in the conventional mode to direct pressurized hydraulic fluid to the arm hydraulic cylinders of the conventional furrow opener assemblies and the singulating furrow opener assemblies to move the conventional furrow opener assemblies and the singulating furrow opener assemblies between the operating position and the transport position, and activating the furrow opener lift system in the singulating mode to direct pressurized hydraulic fluid only to the arm hydraulic cylinders of the singulating furrow opener assemblies and any operating conventional furrow opener assemblies, and preventing hydraulic fluid from moving into or out of the arm hydraulic cylinders of the selected idle conventional furrow openers.

26. The method of claim 17 comprising aligning the singulating furrow opener assemblies along a rank perpendicular to the operating travel direction across the width of the frame such that the singulating furrow opener assemblies are spaced evenly at the selected singulating spacing, and arranging the conventional furrow opener assemblies forward or rearward of the singulating furrow opener assemblies such that all the furrow opener assemblies are evenly spaced across the width of the frame at the narrow row spacing.

27. The method of claim 26 comprising aligning the singulating furrow opener assemblies along a first rank and aligning the conventional furrow opener assemblies along a second rank that is forward or rearward of the first rank, and wherein the selected singulating spacing is two times the narrow row spacing.

28. The method of claim 21 comprising aligning the singulating furrow opener assemblies along a first rank and the conventional furrow opener assemblies along second and third ranks, and wherein the selected singulating spacing is three times the narrow row spacing.

29. The method of claim 17 comprising arranging the furrow opener assemblies in at least three ranks such that singulating furrow opener assemblies are located on at least two ranks, and wherein the selected singulating spacing is at least two times the narrow row spacing.

30. The method of claim 17 comprising arranging the singulating furrow opener assemblies in singulating pairs with first and second singulating furrow opener assemblies spaced at the narrow row spacing, and wherein the singulating pairs are evenly spaced across a width of the frame.

31. The method of claim 17 wherein one of the bulk product containers is a fertilizer container and a fertilizer bulk meter mounted on the fertilizer container is operative to dispense fertilizer from the fertilizer container into a fertilizer air distribution network and through the fertilizer air distribution network to a plurality of fertilizer banding assemblies spaced across the width of the frame, the fertilizer banding assemblies connected only to receive fertilizer from the fertilizer air distribution network, the method comprising activating the furrow opener lift system in the singulating mode to move the fertilizer banding assemblies to an operating position where each fertilizer banding assembly engages the ground surface to create a furrow and operating the bulk fertilizer meter to deliver fertilizer to the furrows created by the fertilizer banding assemblies while moving the air seeder along the ground surface.

* * * * *